(12) United States Patent
Harada et al.

(10) Patent No.: US 6,298,132 B1
(45) Date of Patent: *Oct. 2, 2001

(54) RINGING-TONE CONTROL DEVICE FOR TELEPHONE SET, USING AUDIO SIGNAL SENT BY CALLER

(75) Inventors: Hideo Harada, Hamamatsu; Haruo Suzuki, Yokohama, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,978

(22) Filed: Apr. 1, 1998

(30) Foreign Application Priority Data

May 9, 1997 (JP) ..................................... 9-119498

(51) Int. Cl.[7] .............................. H04M 3/06; H04M 11/02
(52) U.S. Cl. ........................... 379/375; 379/373; 379/418
(58) Field of Search .................................... 379/373, 374, 379/375, 418

(56) References Cited

U.S. PATENT DOCUMENTS

| 4,679,229 | 7/1987 | Yamaguchi . | |
|---|---|---|---|
| 4,723,275 | 2/1988 | Hirth et al. . | |
| 4,737,987 | 4/1998 | Haussman . | |
| 4,856,055 | 8/1989 | Schwartz | 379/374 |
| 4,939,775 | 7/1990 | Houck et al. . | |
| 5,442,694 | 8/1995 | Chitrapu et al. . | |
| 5,481,599 | 1/1996 | MacAllister et al. | 379/101.01 |
| 5,649,007 | * 7/1997 | Yamada | 379/373 |
| 5,659,607 | * 8/1997 | Yamada et al. | 379/373 |
| 6,002,761 | * 12/1999 | Sremac | 379/374 |

FOREIGN PATENT DOCUMENTS

| 3314819A1 | 4/1983 | (DE) . | |
|---|---|---|---|
| 3504243 | 2/1985 | (DE) . | |
| 3504512A1 | 2/1985 | (DE) . | |
| 3612664C2 | 4/1986 | (DE) . | |
| 4222401A1 | 7/1992 | (DE) . | |
| 4328971C2 | 8/1993 | (DE) . | |
| 2220822 | 1/1990 | (GB) | H04M/1/00 |
| 2301261 | 11/1996 | (GB) | H04M/19/04 |
| 62-268338 | 11/1988 | (JP) | H04M/1/00 |
| 1112892 | 5/1989 | (JP) | H04Q/3/58 |
| 3030672 | 8/1996 | (JP) | H04M/1/00 |

* cited by examiner

Primary Examiner—Tālivaldis I. Šmits
(74) Attorney, Agent, or Firm—Connolly Bove Lodge & Hutz

(57) ABSTRACT

In a ringing-tone control device for a telephone set, an audio signal which is sent from a communication opposite party is converted into a corresponding bi-level signal. The bi-level signal is stored into the memory. The bi-level signal is read out from the memory. A ringing tone is generated in response to the bi-level signal read out from the memory.

7 Claims, 5 Drawing Sheets

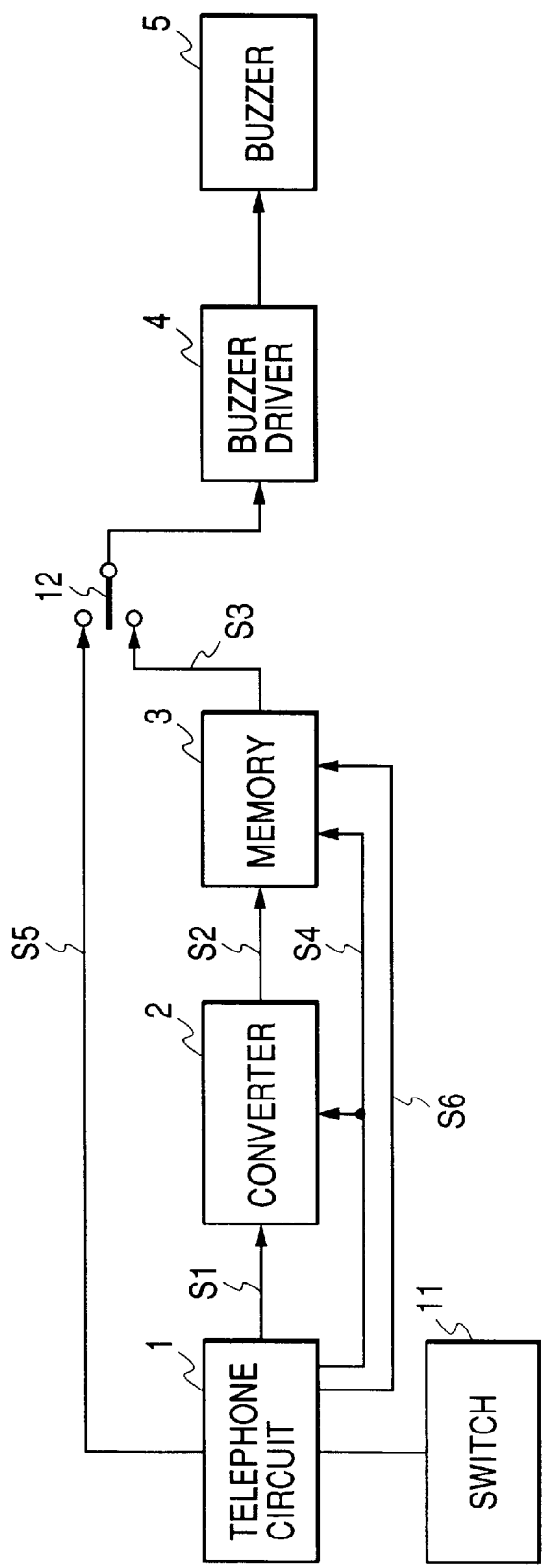

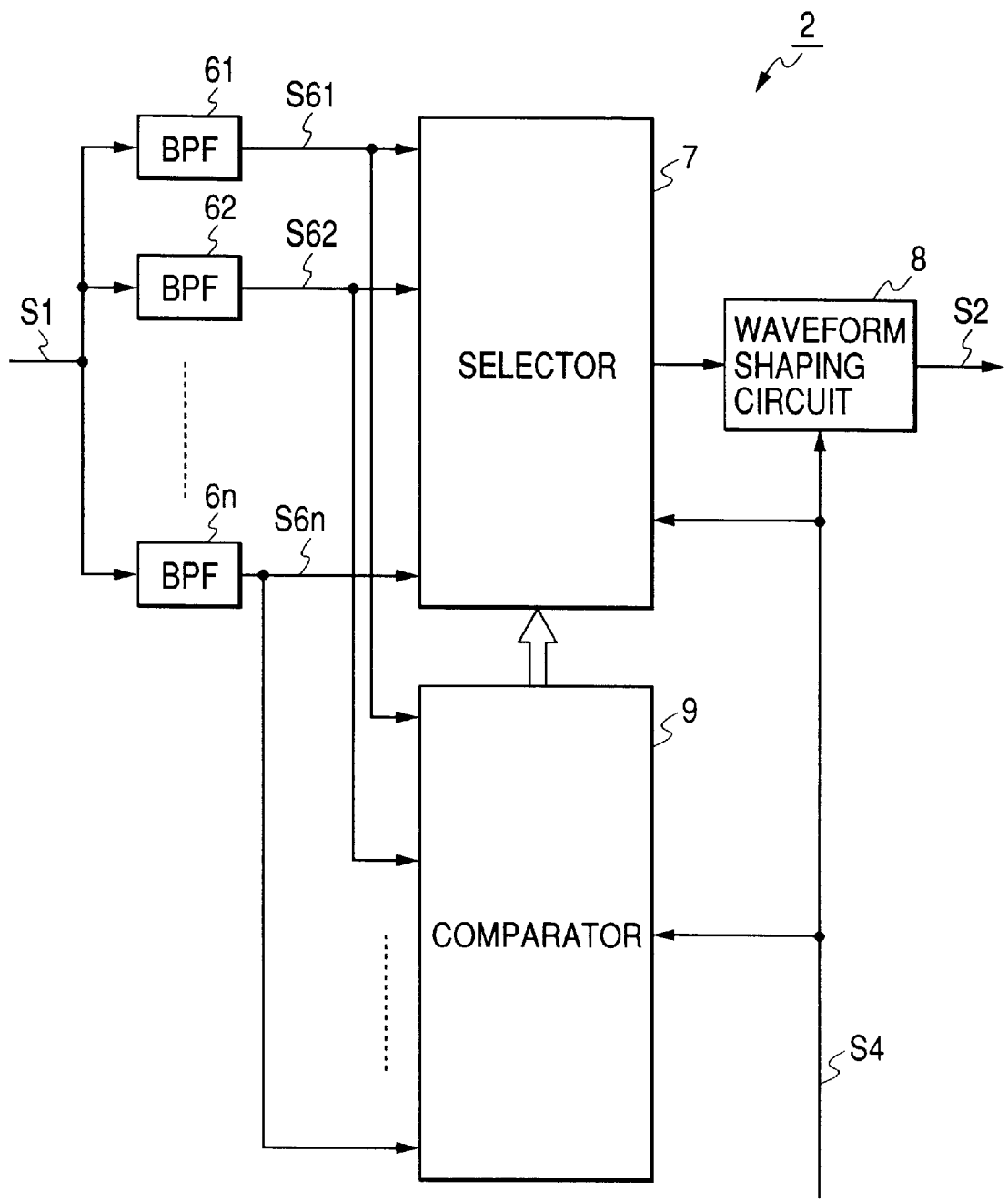

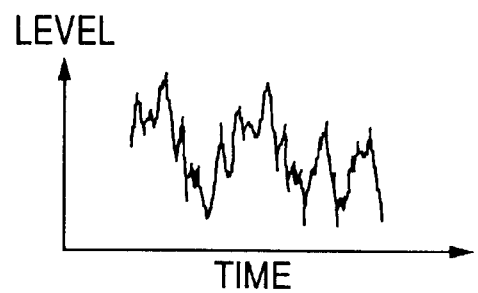
FIG. 3  SIGNAL S1
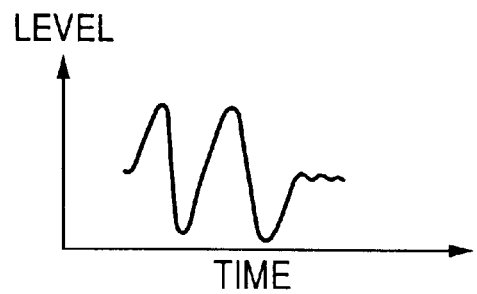
FIG. 4  SIGNAL S61
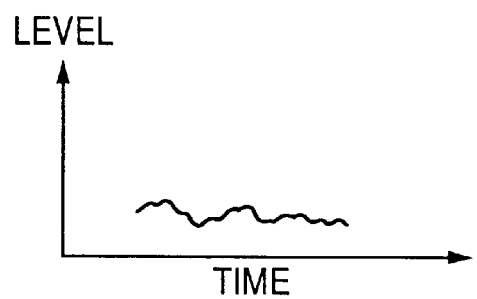
FIG. 5  SIGNAL S62
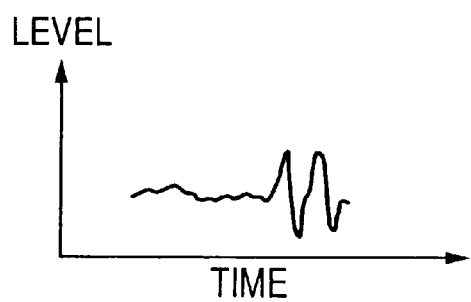
FIG. 6  SIGNAL S6n

FIG. 7  SIGNAL S7
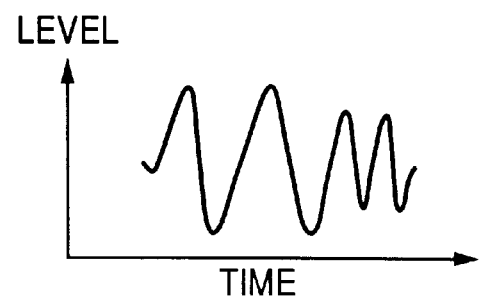
FIG. 8  SIGNAL S2
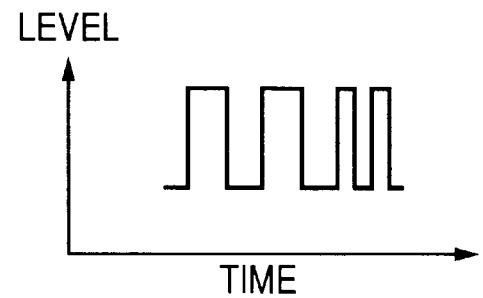

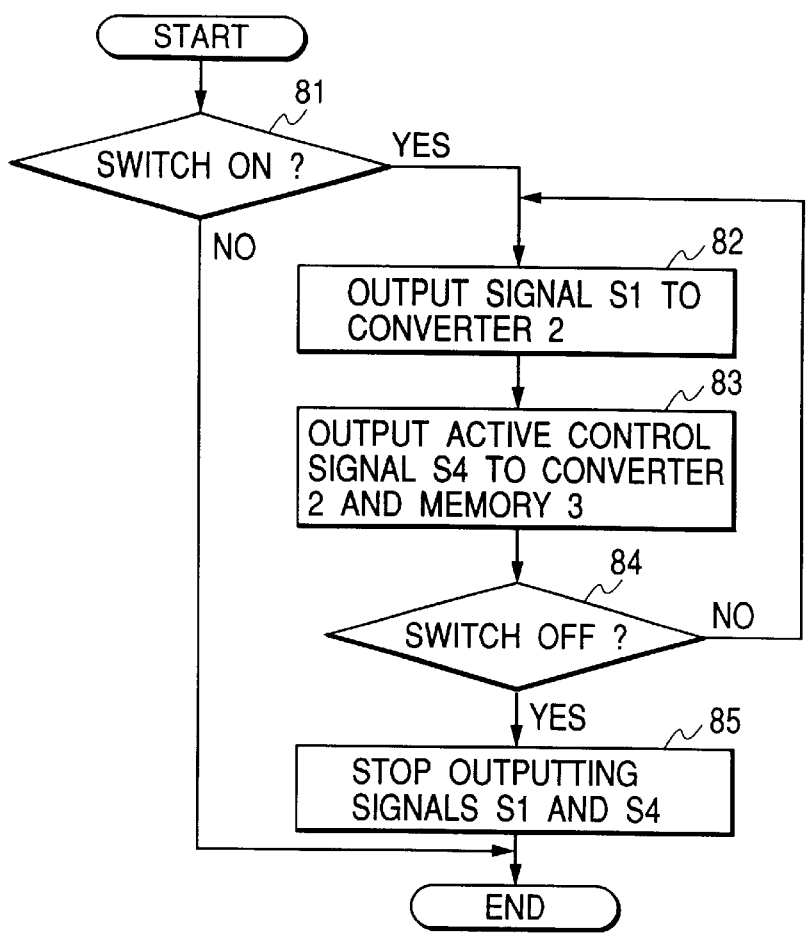
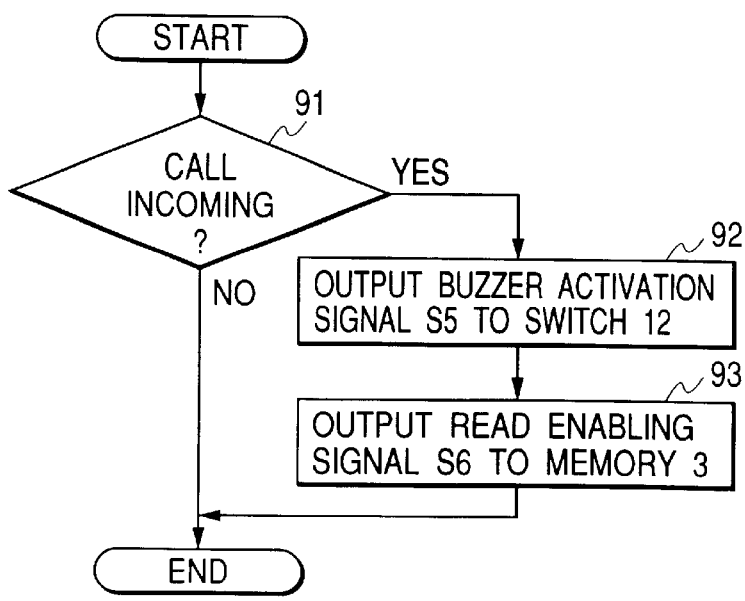

RINGING-TONE CONTROL DEVICE FOR TELEPHONE SET, USING AUDIO SIGNAL SENT BY CALLER

BACKGROUND OF THE INVENTION

1. Field of the Invention

This invention relates to ringing-tone control device for a telephone set.

2. Description of the Related Art

In some portable telephone sets, ringing tones indicative of calls incoming are intermittently generated at different intervals according to a predetermined pattern. Some of known ringing tones have different frequencies.

An advanced portable telephone set has an IC for generating a signal representing a predetermined melody. A ringing tone is produced on the basis of the signal generated by the IC. Thus, the predetermined melody is used as a ringing tone.

It is known that a melody to be used as a ringing tone is made or changed in accordance with user's requirement.

In a known portable telephone set, a musical piece is converted into a corresponding audio signal via a microphone, and the audio signal is recorded in a memory. Upon the arrival of an incoming call, the audio signal is read out from the memory, and a ringing tone is generated on the basis of the audio signal. Thus, the musical piece is used as a ringing tone.

Japanese utility model 3030672 discloses a portable telephone set having a voice recorder into which words uttered by an arbitrary person and meaning a call incoming can be stored. In Japanese utility model 3030672, upon the arrival of an incoming call, the voice recorder is activated to reproduce the words. Thus, the words are used as a ringing tone.

Japanese published unexamined patent application 63-5268338 discloses a telephone set circuit provided with a voice recorder having a memory. A sound is converted into a corresponding audio signal via a handset, and the audio signal is stored into the memory within the voice recorder. Upon the arrival of an incoming call, the audio signal is read out from the memory, and a ringing tone is generated on the basis of the audio signal. Thus, the sound sampled via the handset is used as a ringing tone.

Japanese published unexamined patent application 1-112892 discloses a system including telephone sets and recorders. The recorders correspond to the telephone sets, respectively. The recorders store different signals representing arbitrary sounds, for example, the songs of birds and the sounds of waves. Upon the arrival of an incoming call, the sound-representing signal is read out from the recorder related to the incoming call, and the sound-representing signal is fed to the corresponding telephone set. In the telephone set, a ringing tone is generated on the basis of the sound-representing signal. Thus, the sound-representing signal stored in the recorder is used as a source of a ringing tone.

SUMMARY OF THE INVENTION

It is an object of this invention to provide a device for controlling a ringing tone in a new way.

It is another object of this invention to provide a simple ringing-tone control device for a telephone set.

A first aspect of this invention provides a ringing-tone control device for a telephone set, comprising first means for converting an audio signal, which is sent from a communication opposite party, into a corresponding bi-level signal; a memory; second means for storing the bi-level signal generated by the first means into the memory; third means for reading out the bi-level signal from the memory; and fourth means for generating a ringing tone in response to the bi-level signal read out by the third means.

A second aspect of this invention is based on the first aspect thereof, and provides a ringing-tone control device wherein the fourth means comprises a buzzer, and means for driving the buzzer in response to the bi-level signal read out by the third means.

A third aspect of this invention provides a ringing-tone control device for a telephone set, comprising first means for extracting a fundamental-frequency component from an audio signal which is sent from a communication opposite party, and for using the extracted fundamental-frequency component as a fundamental-frequency signal; a memory; second means for storing the fundamental-frequency signal generated by the first means into the memory; third means for reading out the fundamental-frequency signal from the memory; and fourth means for generating a ringing tone in response to the fundamental-frequency signal read out by the third means.

A fourth aspect of this invention is based on the third aspect thereof, and provides a ringing-tone control device wherein the first means comprises fifth means for separating the audio signal into sub signals having different frequency bands respectively; sixth means for selecting a strongest signal from among the sub signals generated by the fifth means; and seventh means for using the strongest signal selected by the sixth means as the fundamental-frequency signal.

A fifth aspect of this invention is based on the third aspect thereof, and provides a ringing-tone control device wherein the fourth means comprises a buzzer, and means for driving the buzzer in response to the fundamental-frequency signal read out by the third means.

A sixth aspect of this invention provides a ringing-tone control device for a telephone set, comprising first means for extracting a fundamental-frequency component from an audio signal which is sent from a communication opposite party, and for using the extracted fundamental-frequency component as a fundamental-frequency signal; second means for converting the fundamental-frequency signal, which is generated by the first means, into a corresponding bi-level signal; a memory; third means for storing the bi-level signal generated by the second means into the memory; fourth means for reading out the bi-level signal from the memory; and fifth means for generating a ringing tone in response to the bi-level signal read out by the fourth means.

A seventh aspect of this invention is based on the sixth aspect thereof, and provides a ringing-tone control device wherein the first means comprises sixth means for separating the audio signal into sub signals having different frequency bands respectively; seventh means for selecting a strongest signal from among the sub signals generated by the sixth means; and eighth means for using the strongest signal selected by the seventh means as the fundamental-frequency signal.

An eighth aspect of this invention is based on the sixth aspect thereof, and provides a ringing-tone control device wherein the fifth means comprises a buzzer, and means for driving the buzzer in response to the bi-level signal read out by the fourth means.

BRIEF DESCRIPTION OF THE DRAWINGS

FIG. 1 is a block diagram of a portion of a telephone set having a ringing-tone control device according to an embodiment of this invention.

FIG. 2 is a block diagram of a converter in FIG. 1.

FIG. 3 is a time-domain diagram of an example of the waveform of an audio signal in the telephone set of FIG. 1.

FIGS. 4, 5, and 6 are time-domain diagrams of examples of the waveforms of output signals from filters in FIG. 2.

FIG. 7 is a time-domain diagram of an example of the waveform of an output signal from a selector in FIG. 2.

FIG. 8 is a time-domain diagram of an example of the waveform of an output signal from a waveform shaping circuit in FIG. 2.

FIG. 9 is a flowchart of a first segment of a program for a CPU in a telephone circuit in FIG. 1.

FIG. 10 is a flowchart of a second segment of the program for the CPU in the telephone circuit in FIG. 1.

DESCRIPTION OF THE PREFERRED EMBODIMENT

With reference to FIG. 1, a portable telephone set or a home-use telephone set includes a telephone circuit 1, a converter 2, a memory 3, a buzzer driver 4, a buzzer 5, and switches 11 and 12.

The telephone circuit 1 is connected to the converter 2, the memory 3, and the switches 11 and 12. The converter 2 is connected to the memory 3. The memory 3 is connected to the switch 12. The buzzer driver 4 is connected to the switch 12 and the buzzer 5.

The telephone circuit 1 includes a CPU or a similar device which operates in accordance with a program stored in its internal ROM. Operation of the telephone set in FIG. 1 can be changed among a plurality of different modes including a recording mode and a stand-by mode. The switch 11 can be changed between an ON position and an OFF position. The telephone circuit 1 is programmed to change operation of the telephone set to the recording mode when the switch 11 is changed from its OFF position to its ON position. Accordingly, to start the recording mode of operation, the user of the telephone set changes the switch 11 to its ON position. Furthermore, the telephone circuit 1 is programmed to move the telephone set out of the recording mode of operation when the switch 11 is returned to its OFF state.

Generally, the switch 11 is changed to its ON position during communication with the telephone set with an opposite party which sends an audio signal representing a voice, a sound, a music piece, or a song desired by the user of the telephone set.

During the recording mode of operation of the telephone set, the telephone circuit 1 outputs an audio signal S1, which is sent from the communication opposite party, to the converter 2. In addition, the telephone circuit 1 outputs an active control signal S4 to the converter 2. The converter 2 is activated in response to the active control signal S4. The converter 2 extracts a fundamental frequency component from the audio signal S1, and changes the extracted fundamental-frequency component into a corresponding ON-OFF signal (a corresponding bi-level signal or a corresponding binary signal) S2. The converter 2 outputs the ON-OFF signal S2 to the memory 3. The telephone circuit 1 outputs the active control signal S4 also to the memory 3. The active control signal S4 serves as a write enabling signal for the memory 3. Accordingly, the output signal S2 of the converter 2 is written into the memory 3 in response to the active control signal S4 fed from the telephone circuit 1.

When the switch 11 is returned to its OFF position, the telephone circuit 1 stops outputting the audio signal S1 to the converter 2. In addition, the telephone circuit 1 stops outputting the active control signal S4 to the converter 2 and the memory 3, and starts to output an inactive control signal S4 to the converter 2 and the memory 3. The converter 2 is deactivated in response to the inactive control signal S4. The writing of the ON-OFF signal S2 into the memory 3 is suspended in response to the inactive control signal S4. Accordingly, upon return of the switch 11 to its OFF position, the telephone set moves out the recording mode of operation.

As shown in FIG. 2, the converter 2 includes an array of band pass filters (BPF's) 61, 62, . . . , 6n, a selector 7, a waveform shaping circuit 8, and a comparator 9. Here, "n" denotes a predetermined natural number equal to 2 or greater. The selector 7, the waveform shaping circuit 8, and the comparator 9 are activated in response to the active control signal S4 fed from the telephone circuit 1. The selector 7, the waveform shaping circuit 8, and the comparator 9 are deactivated in response to the inactive control signal S4 fed from the telephone circuit 1.

The allowable frequency band of the audio signal S1 is divided into a plurality of different sub bands to which the pass bands of the filters 61, 62, . . . , 6n are previously assigned, respectively. The input sides of the filters 61, 62, . . . , 6n are connected to the telephone circuit 1 (see FIG. 1). The filters 61, 62, . . . , 6n are followed by the selector 7 and the comparator 9. The selector 7 is connected to the comparator 9. The selector 7 is followed by the waveform shaping circuit 8. The waveform shaping circuit 8 is connected to the memory 3 (see FIG. 1).

During the recording mode of operation of the telephone set, the converter 2 in FIG. 2 operates as follows. The filters 61, 62, . . . , 6n receive the audio signal S1 from the telephone circuit 1. The filters 61, 62, . . . , 6n extract different frequency components from the audio signal S1, respectively. The frequency components extracted by the filters 61, 62, . . . , 6n correspond to the pass bands thereof, respectively. The filters 61, 62, . . . , 6n output the extracted frequency components as filtering-resultant signals S61, S62, . . . , S6n, respectively. The selector 7 receives the filtering-resultant signals S61, S62, . . . , S6n from the filters 61, 62, . . . , 6n. In addition, the comparator 9 receives the filtering-resultant signals S61, S62, . . . , S6n from the filters 61, 62, . . . , 6n. The device 9 compares the strengths (the levels or the amplitudes) of the filtering-resultant signals S61, S62 . . . , S6n, and detects one from among the filtering-resultant signals S61, S62, . . . , S6n which has the greatest strength (the greatest level or the greatest amplitude). The comparator 9 generates a selection control signal representing the filter which outputs the detected filtering-resultant signal, that is, the strongest filtering-resultant signal. The comparator 9 outputs the selection control signal to the selector 7. The device 7 selects one from among the filtering-resultant signals S61, S62, . . . , S6n in response to the output signal of the comparator 9. The filtering-resultant signal selected by the device 7 agrees with the strongest filtering-resultant signal, that is, the filtering-resultant signal detected by the comparator 9. In this way, the filters 61, 62, . . . , 6n, the selector 7, and the comparator 9 cooperate to extract the fundamental-frequency component from the audio signal S1. The selector 7 outputs the selected signal (the fundamental-frequency signal) S7 to the waveform shaping circuit 8. The waveform shaping circuit 8 converts the fundamental-frequency signal S7 into a corresponding ON-OFF signal (a corresponding bi-level signal or a corresponding binary signal) S2. The waveform shaping circuit 8 includes, for example, a level comparator or a voltage comparator which compares the voltage of the fundamental-frequency signal S7 with a predetermined threshold voltage. The waveform shaping circuit 8 outputs the ON-OFF signal S2 to the memory 3.

In the case where the audio signal S1 has a waveform as shown in FIG. 3, the filtering-resultant signals S61, S62, and S6n outputted from the filters 61, 62, and 6n vary in waveforms such as those in FIGS. 4, 5, and 6 respectively. During a first interval of time, the filtering-resultant signal S61 is strongest so that the filtering-resultant signal S61 is selected as the fundamental-frequency signal S7. During a second interval of time which follows the first interval of time, the filtering-resultant signal S6n is the strongest so that the filtering-resultant signal S6n is selected as the fundamental-frequency signal S7. Accordingly, the fundamental-frequency signal S7 has a waveform as shown in FIG. 7. The output signal S2 of the waveform shaping circuit 8 periodically changes between an ON state (a high-level state) and an OFF state (a low-level state) as shown in FIG. 8.

The switch 12 can be changed between a normal position and a special position. When the switch 12 is in its normal position, the switch 12 connects the telephone circuit 1 to the buzzer driver 4 and disconnects the memory 3 from the buzzer driver 4. When the switch 12 is in its special position, the switch 12 connects the memory 3 to the buzzer driver 4 and disconnects the telephone circuit 1 from the buzzer driver 4.

It is assumed that the switch 12 is in its special position. During the stand-by mode of operation of the telephone set, when an incoming call enters the telephone set, the telephone circuit 1 outputs a buzzer activation signal S5 to the switch 12 and also outputs a read enabling signal S6 to the memory 3. Since the switch 12 is in its special position so that the buzzer driver 4 is disconnected from the telephone circuit 1, the buzzer activation signal S5 is inhibited from traveling to the buzzer driver 4. On the other hand, an ON-OFF signal S2, which has been stored in the memory 3, is read out from the memory 3 in response to the read enabling signal S6. The ON-OFF signal read out from the memory 3 is outputted to the switch 12 as a buzzer activation signal S3. Since the switch 12 is in its special position so that the memory 3 is connected to the buzzer driver 4, the buzzer activation signal S3 travels from the memory 3 to the buzzer driver 4 via the switch 12. The buzzer driver 4 intermittently activates the buzzer 5 in response to the buzzer activation signal S3. The buzzer 5 generates a ringing tone which depends on the buzzer activation signal S3.

Specifically, the buzzer driver 4 activates the buzzer 5 when the buzzer activation signal S3 is in its ON state (its high-level state). For example, the buzzer 5 generates a predetermined-frequency tone when being activated. The buzzer driver 4 deactivates the buzzer 5 when the buzzer activation signal S3 is in its OFF state (its low-level state). The buzzer 5 does not generate any tone when being deactivated. Accordingly, the buzzer 5 intermittently generates the predetermined-frequency tone in response to the buzzer activation signal S3. Thus, the ringing tone generated by the buzzer 5 is modulated in accordance with the buzzer activation signal S3.

It is assumed that the switch 12 is in its normal position. During the stand-by mode of operation of the telephone set, when in incoming call enters the telephone set, the telephone circuit 1 outputs a buzzer activation signal S5 to the switch 12 and also outputs a read enabling signal S6 to the memory 3. Since the switch 12 is in its normal position so that the buzzer driver 4 is connected to the telephone circuit 1, the buzzer activation signal S5 travels from the telephone circuit 1 to the buzzer driver 4 via the switch 12. The buzzer driver 4 intermittently activates the buzzer 5 in response to the buzzer activation signal S5. The buzzer 5 generates a ringing tone which depends on the buzzer activation signal S5. On the other hand, since the switch 12 is in its normal position so that the buzzer driver 4 is disconnected from the memory 3, any signal does not travel from the memory 3 to the buzzer driver 4.

In the case where operation of the comparator 9 involves non-negligible signal delays, it is preferable to provide delay circuits between the filters 61, 62, ..., 6n and the selector 7.

As previously indicated, the CPU in the telephone circuit 1 operates in accordance with a program stored in its internal ROM. FIG. 9 is a flowchart of a segment of the program which relates to the recording mode of operation of the telephone set. The program segment in FIG. 9 is iteratively executed.

As shown in FIG. 9, a first step 81 of the program segment decides whether or not the switch 11 is in its ON position. When it is decided that the switch 11 is not in its ON position, the program exits from the step 81 and then the current execution cycle of the program segment ends. When it is decided that the switch 11 is in its ON position, the program advances from the step 81 to a step 82.

The step 82 outputs an audio signal S1 to the converter 2. A step 83 following the step 82 outputs an active control signal S4 to the converter 2 and the memory 3.

A step 84 subsequent to the step 83 decides whether or not the switch 11 is in its OFF position. When it is decided that the switch 11 is in its OFF position, the program advances from the step 84 to a step 85. When it is decided that the switch 11 is not in its OFF position, the program returns from the step 84 to the step 82.

The step 85 stops outputting the audio signal S1 to the converter 2. In addition the step 85 stops outputting the active control signal S4 to the converter 2 and the memory 3. After the step 85, the current execution cycle of the program segment ends.

FIG. 10 is a flowchart of another segment of the program which relates to the generation of a ringing tone. The program segment in FIG. 10 is iteratively executed.

As shown in FIG. 10, a first step 91 of the program segment decides whether or not an incoming call arrives at the telephone set. When it is decided that an incoming call arrives, the program advances from the step 91 to a step 92. When it is decided that any incoming call does not arrive, the program exits from the step 91 and then the current execution cycle of the program segment ends.

The step 92 outputs a buzzer activation signal S5 to the switch 12. A step 93 following the step 92 outputs a read enabling signal S6 to the memory 3. After the step 93, the current execution cycle of the program segment ends.

What is claimed is:

1. A ringing-tone control device for a telephone set, comprising:

first means for extracting a fundamental-frequency component from an audio signal which is sent from a communication opposite party, and for using the extracted fundamental-frequency component as a fundamental-frequency signal;

a memory;

second means for storing the fundamental-frequency signal generated by the first means into the memory;

third means for reading out the fundamental-frequency signal from the memory; and fourth means for generating a ringing tone in response to the fundamental-frequency signal read out by the third means.

2. A ringing-tone control device as recited in claim 1, wherein the first means comprises:

fifth means for separating the audio signal into sub signals having different frequency bands respectively;

sixth means for selecting a strongest signal from among the sub signals generated by the fifth means; and seventh means for using the strongest signal selected by the sixth means as the fundamental-frequency signal.

3. A ringing-tone control device as recited in claim 1, wherein the fourth means comprises a buzzer, and means for driving the buzzer in response to the fundamental-frequency signal read out by the third means.

4. A ringing-tone control device for a telephone set, comprising:

first means for extracting a fundamental-frequency component from an audio signal which is sent from a communication opposite party, and for using the extracted fundamental-frequency component as a fundamental-frequency signal;

second means for converting the fundamental-frequency signal, which is generated by the first means, into a corresponding bi-level signal;

a memory;

third means for storing the bi-level signal generated by the second means into the memory;

fourth means for reading out the bi-level signal from the memory; and fifth means for generating a ringing tone in response to the bi-level signal read out by the fourth means.

5. A ringing-tone control device as recited in claim 4, wherein the first means comprises:

sixth means for separating the audio signal into sub signals having different frequency bands respectively;

seventh means for selecting a strongest signal from among the sub signals generated by the sixth means; and eighth means for using the strongest signal selected by the seventh means as the fundamental-frequency signal.

6. A ringing-tone control device as recited in claim 4, wherein the fifth means comprises a buzzer, and means for driving the buzzer in response to the bi-level signal read out by the fourth means.

7. A ringing-tone control device for a telephone set, comprising:

first means for converting an audio signal, which is sent from a party to a communication, into a corresponding bi-level signal taking only values representing a logic state of "0" and a logic state of "1";

a digital memory;

second means for storing the bi-level signal generated by the first means into the digital memory;

third means for reading out the bi-level signal from the digital memory;

a buzzer; and fourth means for feeding the bi-level signal read out by said third means to the buzzer without converting the bi-level signal to an analog form, and for driving the buzzer by the bi-level signal to generate a ringing tone.

* * * * *